US010072748B2

(12) United States Patent
Carr et al.

(10) Patent No.: US 10,072,748 B2
(45) Date of Patent: Sep. 11, 2018

(54) AXLE OIL FLOW CONTROLLER ON PINION SPACER

(71) Applicant: Schaeffler Technologies AG & Co. KG, Herzogenaurach (DE)

(72) Inventors: Stephen Carr, Waterford, MI (US); Shaun Tate, Grand Blanc, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 150 days.

(21) Appl. No.: 15/098,695

(22) Filed: Apr. 14, 2016

(65) Prior Publication Data

US 2017/0299044 A1  Oct. 19, 2017

(51) Int. Cl.
*F16H 57/04* (2010.01)
*F16H 48/42* (2012.01)

(52) U.S. Cl.
CPC ........... *F16H 57/042* (2013.01); *F16H 48/42* (2013.01); *F16H 57/0483* (2013.01); *F16H 2048/423* (2013.01)

(58) Field of Classification Search
None
See application file for complete search history.

(56) References Cited

U.S. PATENT DOCUMENTS

| 4,242,923 | A | * | 1/1981 | Nishikawa | B60K 17/08 184/6.12 |
| 4,244,242 | A | * | 1/1981 | Uno | B60K 5/02 184/11.1 |
| 4,319,499 | A | * | 3/1982 | Sanui | F16C 33/6666 184/11.1 |
| 5,328,275 | A | * | 7/1994 | Winn | B60B 27/001 384/472 |
| 8,523,733 | B1 | | 9/2013 | Lippert | |
| 8,657,073 | B2 | * | 2/2014 | Matsumoto | F16H 57/0483 184/11.1 |
| 2004/0173042 | A1 | * | 9/2004 | Jacob | F16C 19/182 74/424 |
| 2005/0213861 | A1 | * | 9/2005 | Ono | F16C 19/364 384/571 |

\* cited by examiner

*Primary Examiner* — Jacob S Scott
(74) *Attorney, Agent, or Firm* — Volpe and Koenig, P.C.

(57) ABSTRACT

A differential assembly arrangement with optimized pinion shaft bearing lubrication is provided. The assembly includes a housing, a ring gear, a pinion gear, a pinion shaft supported by two rolling element bearings, a sleeve, and a lubrication deflector. The two rolling element bearings, a pinion head bearing bearing and a pinion tail bearing, are located at each end of the sleeve which fits over the pinion shaft. The sleeve helps facilitate the application of a pre-load to the bearings. The lubrication deflector is located along the length of the sleeve for providing the correct amount of lubricant to the two bearings. The deflector is in the form of a ring located on the sleeve or integrated within the sleeve.

19 Claims, 6 Drawing Sheets

AXLE OIL FLOW CONTROLLER ON PINION SPACER

BACKGROUND

The present invention relates to a differential assembly, and more particularly, to the lubrication of the rolling element support bearings for the pinion shaft of the differential assembly.

Differential assemblies are well known and arranged in the drive train system of a motor vehicle to allow a pair of output shafts, operatively coupled to an input shaft, to rotate at different speeds. As the output shafts are connected to the wheels of the vehicle, this function is required to allow the outer drive wheel to rotate faster than the inner drive wheel while the vehicle is turning. Differential assemblies utilize rolling element bearings to support the pinion shaft which provides rotational input to the output shafts.

Rolling element bearings require lubrication to keep the bearing components cool and maintain a required lubrication film thickness, both of which are required to meet bearing lifetime requirements. Excessive lubrication can be detrimental and impose a drag, termed as churning losses, on the rolling element bearing, resulting in an undesirable increase in friction.

Referring to FIG. 1, a cross-sectional view of a prior art differential assembly is shown. The differential assembly 100 contains a housing 102 along with a ring gear 104, a pinion shaft 106 and a pinion gear 108. The pinion shaft is supported by a pinion head bearing 110 and a pinion tail bearing 112. A sleeve 114 abuts against the respective inner rings of the two bearings, assisting with applying the necessary pre-load for optimum operating clearance purposes. The differential housing contains lubricant to a level L, resulting in portions of the pinion gear 108, the ring gear 104, the pinion head bearing 110 and the pinion tail bearing 112 being immersed in lubricant when the vehicle is on level ground. The pinion shaft 106 provides rotational input to the ring gear 104 via the pinion gear 108. As rotation and subsequent meshing of the gears occurs, oil is splashed within the housing 102. The splash lubricant follows a path through a port 116 indicated by the arrows to reach the space between the bearings, providing both bearings 110, 112 with lubricant. This path of oil is particularly vital to the pinion tail bearing 112 during low lubricant level conditions or when the vehicle is travelling downhill and the lubricant moves away from the tail bearing. Due to the proximity of the pinion head bearing 110 to the pinion gear 108, the pinion head bearing 110 receives splash lubrication from the pinion gear interface with the ring gear 104. Therefore, the pinion head bearing 110 receives lubrication from both sides, exceeding the amount of lubrication provided to the pinion tail bearing 112 during most operating conditions and oil level conditions. In order to ensure adequate lubrication is delivered to the pinion tail bearing, the port 116 must be arranged to capture and direct enough lubricant to ensure that the lifetime requirement of the pinion tail bearing 112 is met during the worst case lubrication conditions. The disadvantage of this strategy is that excessive lubrication is provided to the pinion head bearing 110 which yields higher bearing friction due to churning losses. It is necessary to provide adequate, but not excessive lubrication to both of the bearings for optimum efficiency of the differential assembly.

SUMMARY

A differential assembly arrangement with optimized pinion shaft bearing lubrication is provided. The assembly includes a housing, a ring gear, a pinion gear, a pinion shaft supported by two rolling element bearings, a sleeve, and a lubrication deflector. The two rolling element bearings in the form of a pinion head bearing and a pinion tail bearing are located at each end of the sleeve which fits over the pinion shaft. The sleeve helps facilitate the application of a pre-load to the bearings. The lubrication deflector is located along the length of the sleeve for providing the correct amount of lubricant to the two bearings. Preferably, the deflector is made of metal but can also be made of plastic or an elastomer.

In one embodiment, the deflector is in the form of a ring or multiple rings that project away from the sleeve. More than one ring is possible. The amount of lubrication that flows past the deflector is a function of the projection length of the ring in addition to the axial location of the ring along the sleeve. In another aspect, a protruding feature on the housing opposite the ring works together with the deflector to regulate the flow of oil.

In another embodiment, the sleeve and deflector are integrally formed as one component. In another aspect, the shape of the protruding deflector provides for an added elastic characteristic; thereby, the sleeve and deflector combination can be used as a spring-like component to provide pre-load to the bearings.

In another arrangement an oil flow regulator for the bearings of a pinion shaft or other shaft can be used separately from a differential assembly to provide the proper amount of lubrication to each of the two bearings. Preferably the regulator is made of metal, but can also be made of plastic or an elastomer. As within the differential assembly, an additional embodiment integrates the sleeve and deflector into one component, with an additional aspect including a spring-like characteristic.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
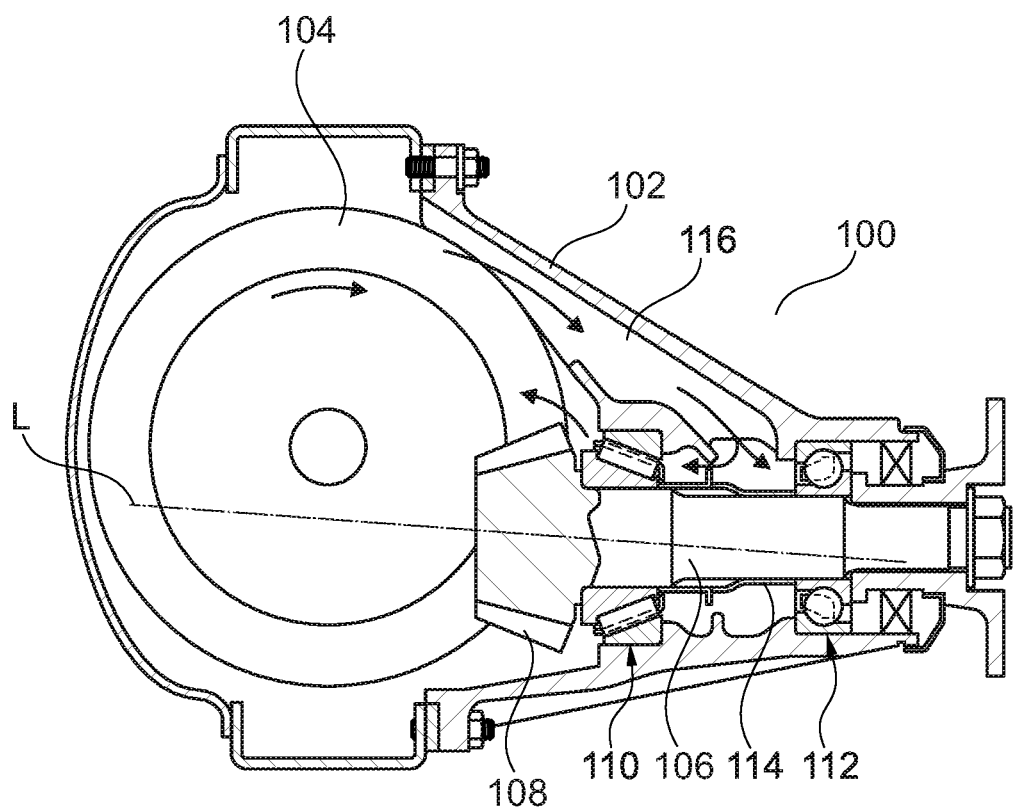
FIG. 1 is a cross-sectional view of a prior art differential assembly.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Figure 2:
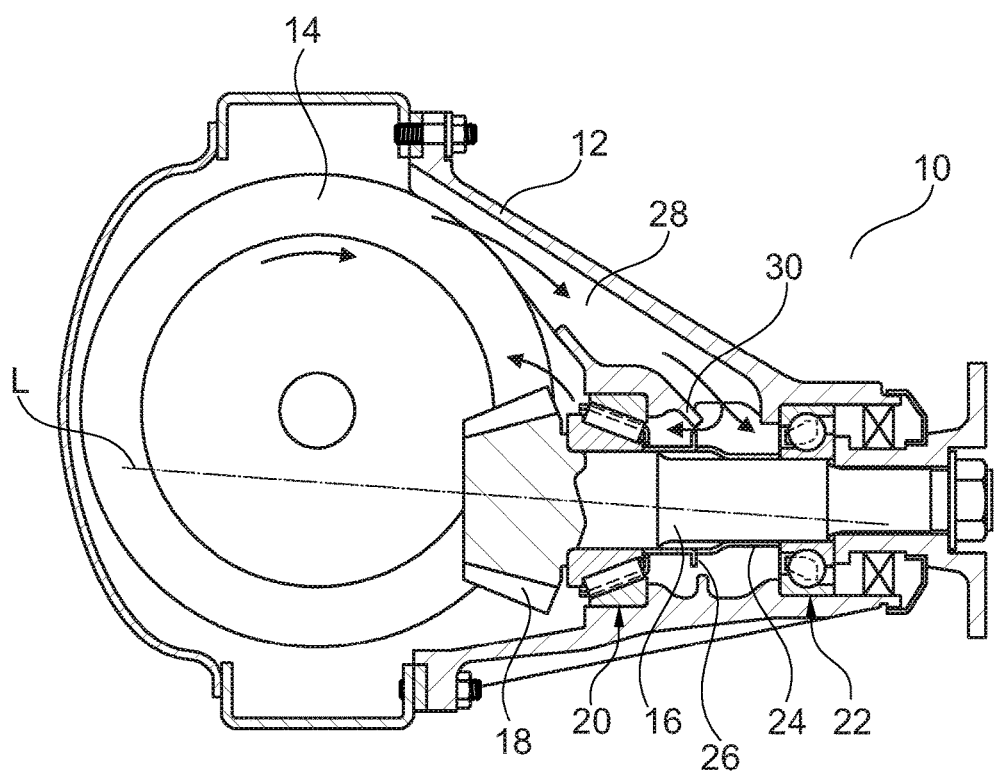
FIG. 2 is a cross-sectional view of a differential assembly with a first embodiment of a deflector.
Figure 3:
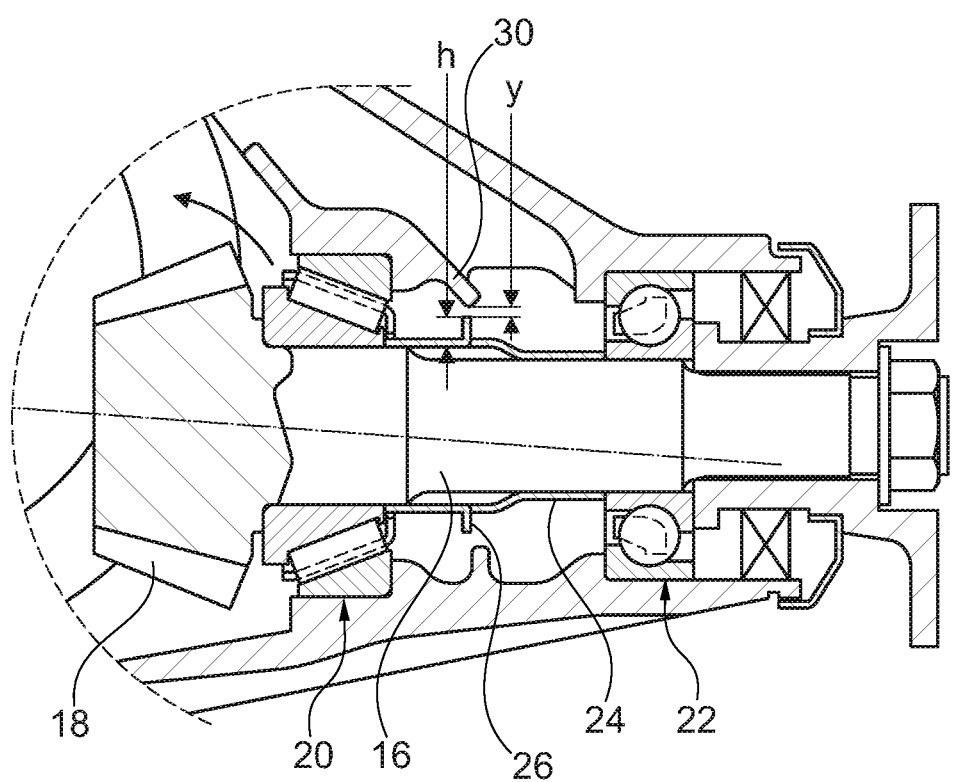
FIG. 3 is an enlarged portion of the cross-sectional view of the differential assembly of FIG. 2.

Referring to FIGS. 2 and 3, a differential assembly 10 with a first embodiment of a deflector 26 to guide and regulate the oil flow to the pinion shaft bearings is shown. The differential assembly 10 includes a housing 12, a ring gear 14, a pinion shaft 16 and a pinion gear 18. The pinion shaft 16 is supported by two bearings, a pinion head bearing 20 and a pinion tail bearing 22. One that is skilled in the art of differentials would understand from the present disclosure that each of these bearings could be in the form of any rolling element bearing; examples include tapered roller, angular contact ball, and tandem ball bearings. The deflector 26 directs and regulates the amount of oil that flows to the pinion head bearing 20, such that most of the splash oil that flows through a port 28 formed in the housing is fed to the pinion tail bearing 22. In this embodiment the deflector 26 is integrated with sleeve 24 to reduce the number of components. Potential materials for this component include, but are not limited to, metal and plastic. Multiple design facets permit different lubrication flow rates to the pinion head bearing 20 which include, but are not limited to, deflector height h and deflector axial position along the length of the sleeve 24. In a preferred aspect of this embodiment, the housing 12 further includes a housing protrusion 30 located opposite to the deflector 26. As shown in FIG. 3, distance y, which defines the opening between the housing protrusion 30 and the deflector 30, is another design facet that will affect the lubrication flow rate to pinion head bearing 20. Preferably, this distance ranges from 1 to 25 mm, however, the distance y can vary depending on the particular application.

Figure 4:
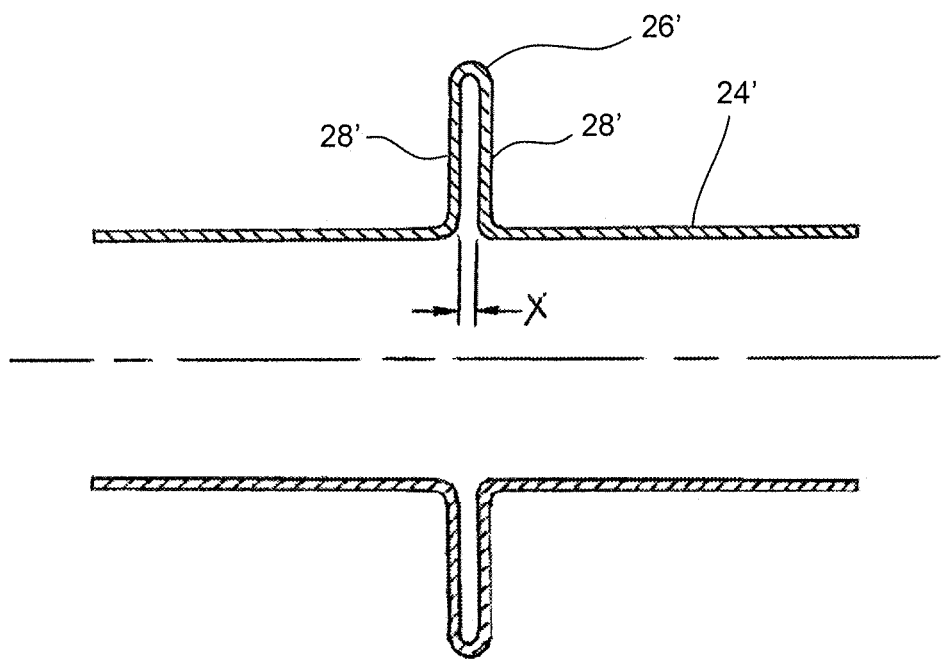
FIG. 4 is a cross-sectional view of a variation of the first embodiment of the deflector shown in FIG. 2.

Referring now to FIG. 4, a variation of the first embodiment of the sleeve 24' is shown that includes an integral deflector 26'. The deflector 26' is integrated as a u-shaped radial protrusion formed in a wall of the sleeve 24' that defines two radially extending rings 28', with a space between the rings 28' denoted as x, which adds a spring-like characteristic to the sleeve 24'. Preferably, the minimum space defined by x is 0.02 mm. This sleeve 24' captures an additional function as a bearing pre-load device, often termed as a "crush ring" to those familiar in the art. The preferred material is metal with a protrusion wall thickness that is equal to or less than the wall thickness of the remainder of the sleeve 24'. In one preferred embodiment, the thickness of the sleeve 24' is 0.5 to 4 mm.

Figure 5:
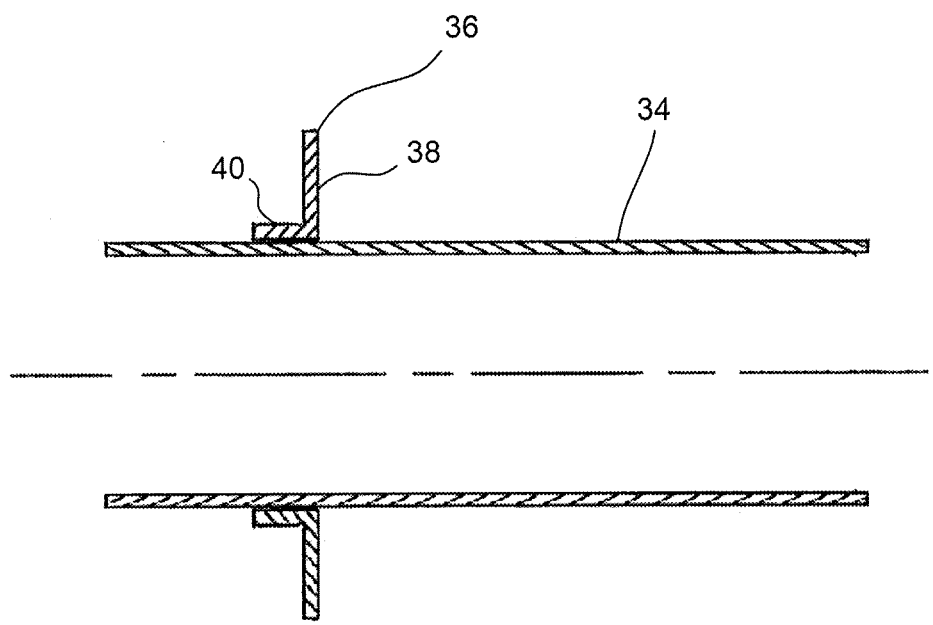
FIG. 5 is a cross-sectional view of a second embodiment of a deflector.

FIG. 5 shows a second embodiment of a deflector 36 in the form of a radially extending ring 38 that is located on the circumference of the sleeve 34. Preferably, the material of the ring is metal or plastic. The deflector 36 can include an axially extending flange 40 for mounting on the sleeve 34.

Figure 6:
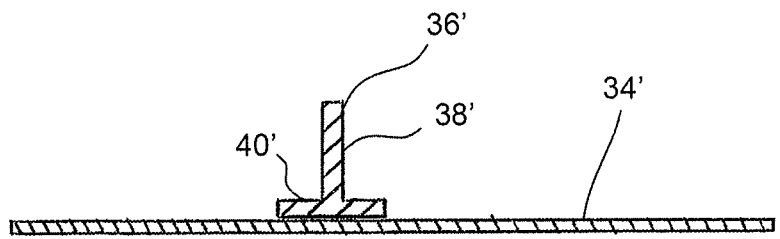
FIG. 6 is a cross-sectional view of a variation of the second embodiment of the deflector shown in FIG. 5.
Figure 6:
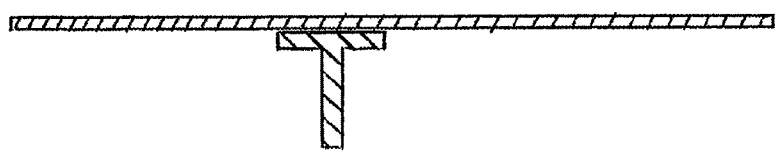

FIG. 6 shows another variation of the second embodiment of the deflector 36' in the form of a radially extending ring 38' that is located on the circumference of the sleeve 34'. Preferably, the material is metal or plastic. The deflector 36' can include an axially extending flange 40' which in this variation forms a "T"-shaped cross-section with the ring 38' that provides additional support for the ring 38' as well as a mounting surface for connection to the sleeve 34'.

Figure 7:
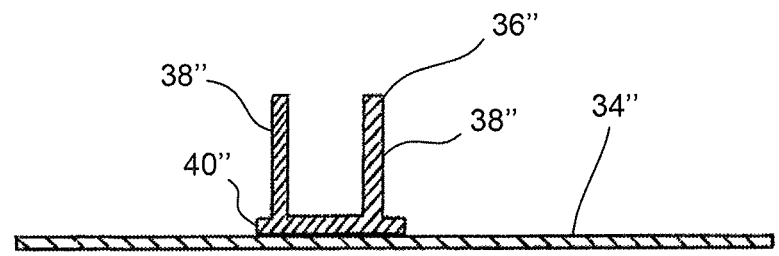
FIG. 7 is a cross-sectional view of another variation of the second embodiment of the deflector.
Figure 7:
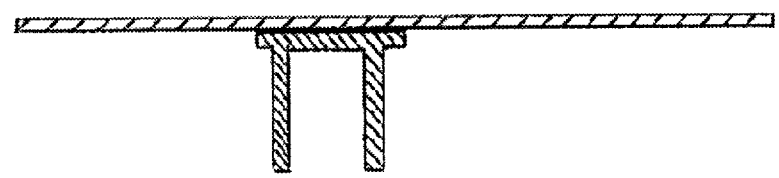

FIG. 7 is a further variation of the second embodiment of a deflector 36" that includes two radially extending rings 38" that are located on the circumference of the sleeve 34". These are supported on an axially extending flange 40" that allows mounting on the sleeve 34". Quantities of protruding rings that are greater than two are possible within one deflector. Preferably, the material is metal or plastic. This arrangement can function in connection with the protrusion 30 shown in FIGS. 2 and 3 to form a resistive path in order to further limit lubricant flow to the pinion head bearing 20.

Figure 8:
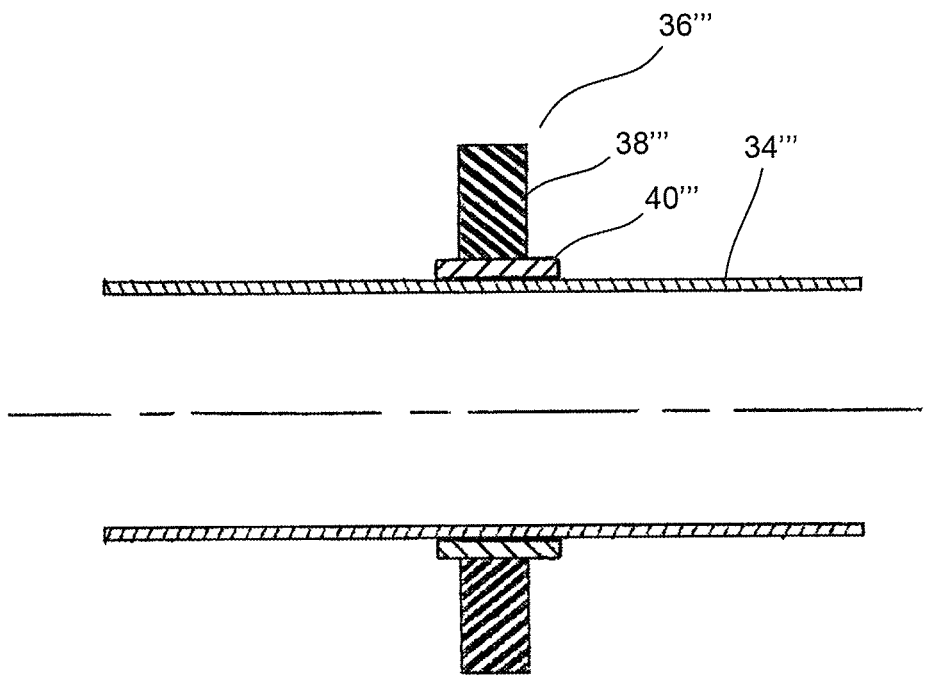
FIG. 8 is a cross-sectional view of a further variation of the second embodiment of the deflector.

FIG. 8 is yet another variation of the second embodiment of a deflector 36'" in the form of an elastomeric ring arrangement 38'" that is formed of an elastomeric material that is integrated with a metal flange 40'" that allows for mounting on the circumference of the sleeve 34'".

The deflectors 36, 36', 36", 36'" can be mounted by an adhesive, or interference fit, or a weld to the sleeve 34, 34', 34", 34'".

Having thus described various embodiments of the present bearing arrangement in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A differential assembly comprising:
a housing defining a port;
a ring gear disposed within the housing;
a pinion shaft disposed within the housing having a pinion gear located on a first end of the pinion shaft for engaging the ring gear;
a pinion head bearing, proximate to the pinion gear, for supporting the pinion shaft with respect to the housing;
a pinion tail bearing for supporting the pinion shaft with respect to the housing, the port of the housing defining a lubricant outlet between the pinion head bearing and the pinion tail bearing;
a sleeve disposed on the pinion shaft with a first end in contact with the pinion head bearing and a second end in contact with the pinion tail bearing; and
a deflector, disposed on the sleeve for regulating a flow of lubricant to the pinion tail bearing and the pinion head bearing, the deflector being axially offset from the lubricant outlet.

2. The differential assembly of claim 1, wherein the deflector material is metal.

3. The differential assembly of claim 1, wherein the deflector material is at least one of a plastic or an elastomer.

4. The differential assembly of claim 1, wherein the deflector is formed as a ring extending radially outwardly from the sleeve.

5. The differential assembly of claim 1, wherein the housing has a protrusion located opposite to the deflector, and the protrusion and the deflector are radially co-planar.

6. The differential assembly of claim 5, wherein a spacing between a distal end of the protrusion of the housing and a distal end of the deflector is set to adjust an amount of lubricant flow to the pinion head bearing and the pinion tail bearing.

7. The differential assembly of claim 4, wherein there are a plurality of rings.

8. The differential assembly of claim 1, wherein the deflector is formed integrally with the sleeve.

9. The differential assembly of claim 8, wherein the deflector is formed as a radially outwardly directed protrusion of a wall of the sleeve defining two outwardly extending rings having a space of at least 0.02 mm located therebetween.

10. The differential assembly of claim 9, wherein a wall thickness of the two outwardly extending rings is less than or equal to a thickness of a remainder of the sleeve wall.

11. The differential assembly of claim 10, wherein the radially outwardly directed protrusion is axially compressible to pre-load the pinion head bearing and pinion tail bearing.

12. The differential assembly of claim 11, wherein the radially outwardly directed protrusion is axially elastically compressible.

13. An oil flow regulator for a pinion shaft of a differential assembly for regulating lubricant flow to a pinion tail bearing and a pinion head bearing, the oil flow regulator comprises a sleeve adapted to extend between the pinion head bearing and pinion tail bearing; and an annular ring with a radially extending lip located at a medial position on the sleeve, such that the lubricant flow to the tail bearing is greater than to the head bearing.

14. The oil flow regulator of claim 13, wherein the regulator material is metal.

15. The oil flow regulator of claim 13, wherein the regulator material is at least one of a plastic or an elastomer.

16. The oil flow regulator of claim 13 further comprising a second annular ring, the two annular rings being formed a radially outwardly directed protrusion of a wall of the sleeve having a space of at least 0.02 mm located therebetween.

17. The differential assembly of claim 16, wherein a wall thickness of the two annular rings is less than or equal to a wall thickness of a remainder of the sleeve wall.

18. The differential assembly of claim 17, wherein the radially outwardly directed protrusion is axially compressible to pre-load the pinion head bearing and the pinion tail bearing.

19. The differential assembly of claim 18, wherein the outwardly directed protrusion is axially elastically compressible.

* * * * *